Patented Nov. 8, 1932

1,887,475

UNITED STATES PATENT OFFICE

WALTER WETTSTEIN, OF MONTHEY, SWITZERLAND, ASSIGNOR TO SOCIETY OF CHEMICAL INDUSTRY IN BASLE, OF BASEL, SWITZERLAND

SYNTHESIS OF AMMONIA

No Drawing. Application filed May 21, 1931, Serial No. 539,144, and in Switzerland July 1, 1930.

It is known that the activity of iron catalysts which are used for the synthesis of ammonia from its elements under pressure is considerably enhanced by the addition of other substances which are called promoters, and that arsenic, boron, phosphorus, surfur, selenium and tellurium and their compounds have an unfavourable effect on the catalysts.

According to the present invention one or more of certain of these last-named elements or compounds thereof, namely the elements of the fifth group of the periodic classification, which, one the one part, react with oxygen to form oxides of the type $R_2O_3$, which further yield with hydrogen volatile compounds, and the atomic weight of which is not higher than 75, such as arsenic, and phosphorus, which have hitherto been regarded as contact poisons, are incorporated in small proportion with the catalyst in addition to the promoter. Such an incorporation not only does no harm but, on the contrary, increases the effect of the usual additions which are known to be favorable.

The manufacture of a catalyst according to the invention may be as follows:—

Ferrum reductum or another suitable pulverulent iron, is mixed intimately with the usual promoter and with a small proportion of one or more of the elements arsenic, phosphorus, or compounds thereof, and the whole is subjected to an oxidizing fusion in a current of oxygen. The combustion of the iron produces the heat necessary for the fusion. The catalyst may also be obtained by heating to its melting point, by application of heat, an oxide of iron, or a compound of iron which becomes oxide when heated, mixed with a promoter and one or more of the aforesaid elements or compounds thereof. The oxide mass is broken into pieces and reduced in the contact furnace at 450–500° C.

The following examples illustrate the invention: in each case the results are based on the same speed of passage of the reaction gases through the contact chamber, namely a speed of 19.4 litres per cubic centimetre of contact chamber space per hour:

Example 1

(a.) An iron catalyst is made according to the above prescription with the use of about 10 per cent. of calcium oxide as the promoter. When reduction is complete, the catalyst yields at 90 atmospheres pressure and at 450° C. 935 grams of ammonia per litre of contact chamber space per hour, the concentration of the ammonia being 7.1 per cent. by volume in the mixture of gases subjected to catalysis.

(b.) When in mixing the catalyst there is added, besides the calcium oxide, 3.3 per cent. of calcium arsenate, the yield of ammonia, under otherwise the same conditions of working, amounts to 1015 grams per litre of contact chamber space per hour, the concentration of the ammonia being 7.7 per cent. by volume.

Example 2

(a.) The catalyst is made with the use of about 25 per cent. of potassium nitrate as the promoter. Under the same conditions as those named in Example 1(a) the yield of ammonia is 280 grams per litre of contact chamber space per hour, the concentration of ammonia being 2.2 per cent. by volume.

(b.) When, in addition to potassium nitrate, 12.5 per cent. of ammonium phosphate is added to the catalyst, the yield of ammonia is 840 grams per litre of contact chamber space per hour, the concentration of the ammonia being 6.4 per cent. by volume.

(c.) When instead of 12.5 per cent. of ammonium phosphate as prescribed in Example 2(b) there is used 4.5 per cent. of red phosphorus, there is obtained a catalyst yielding results identical with those described in Example 2(b).

In the course of a week, the activity of the catalyst described in Example 2(a) decreased by about 5 per cent., whereas in the same period the activity of the catalyst described in Example 2(b), when used in a contact chamber of the same volume for treating the same gases, decreased only by about 2 per cent.

What I claim is:—

1. In the manufacture of ammonia by synthesis from its elements under pressure, the improvement which consists in conducting a mixture of hydrogen and nitrogen over an iron catalyst in which has been incorporated, in addition to promoters, a small proportion of the solid elements of the fifth group of the periodic classification, which elements, on the one part, react with oxygen to form oxides of the type $R_2O_3$, which further yield with hydrogen volatile compounds, and the atomic weight of which is not higher than 75.

2. In the manufacture of ammonia by synthesis from its elements under pressure, the improvement which consists in conducting a mixture of hydrogen and nitrogen over an iron catalyst in which has been incorporated, in addition to promoters, a small proportion of the element arsenic.

3. In the manufacture of ammonia by synthesis from its elements under pressure, the improvement which consists in conducting a mixture of hydrogen and nitrogen over an iron catalyst in which has been incorporated, in addition to promoters, a small proportion of a compound of the element arsenic.

4. In the manufacture of ammonia by synthesis from its elements under pressure, the improvement which consists in conducting a mixture of hydrogen and nitrogen over an iron catalyst in which has been incorporated, in addition to promoters, a small proportion of the element phosphorus.

5. In the manufacture of ammonia by synthesis from its elements under pressure, the improvement which consists in conducting a mixture of hydrogen and nitrogen over an iron catalyst in which has been incorporated, in addition to promoters, a small proportion of a compound of the element phosphorus.

In witness wheref I have hereunto signed my name this 11th day of May, 1931.

WALTER WETTSTEIN.